US012298707B2

(12) United States Patent
Umeno

(10) Patent No.: US 12,298,707 B2
(45) Date of Patent: May 13, 2025

(54) COOLING DEVICE AND IMAGE FORMING APPARATUS

(71) Applicant: Konica Minolta, Inc., Tokyo (JP)

(72) Inventor: Hideyuki Umeno, Sagamihara (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 18/320,330

(22) Filed: May 19, 2023

(65) Prior Publication Data

US 2023/0393524 A1 Dec. 7, 2023

(30) Foreign Application Priority Data

Jun. 3, 2022 (JP) ................................ 2022-090555

(51) Int. Cl.
*G03G 21/20* (2006.01)

(52) U.S. Cl.
CPC .................................. *G03G 21/206* (2013.01)

(58) Field of Classification Search
CPC ......... G03G 21/206; G03G 2221/1645; G03G 2215/20; G03G 15/6573
See application file for complete search history.

(56) References Cited

U.S. PATENT DOCUMENTS

| | | | | |
|---|---|---|---|---|
| 2007/0071485 | A1* | 3/2007 | Yuasa | G03G 21/206 399/92 |
| 2014/0212164 | A1* | 7/2014 | Miyagawa | G03G 21/206 399/92 |
| 2016/0246254 | A1* | 8/2016 | Michibata | B01D 46/0045 |
| 2024/0359931 | A1* | 10/2024 | Tsuchiya | B65H 29/52 |

FOREIGN PATENT DOCUMENTS

| | | | |
|---|---|---|---|
| JP | 2002014597 | A | 1/2002 |
| JP | 2020194064 | A | 12/2020 |

* cited by examiner

*Primary Examiner* — Jessica L Eley
(74) *Attorney, Agent, or Firm* — CANTOR COLBURN LLP

(57) ABSTRACT

A cooling device which cools an inside of an image forming apparatus that forms an image on paper, the cooling device includes an overall cooler that cools an entire inside of the image forming apparatus using overall cooling air flowing inside the image forming apparatus, and a partial cooler that blows cooling air to a part to be cooled to cool the part to be cooled, in which volume of the cooling air on a leeward side of the overall cooling air is smaller than volume of the cooling air on a windward side of the overall cooling air in the partial cooler.

6 Claims, 7 Drawing Sheets

COOLING DEVICE AND IMAGE FORMING APPARATUS

CROSS-REFERENCE TO RELATED APPLICATIONS

The present invention claims priority under 35 U.S.C. § 119 to Japanese Patent Application No. 2022-090555 filed on Jun. 3, 2022, the entire contents of which being incorporated herein by reference.

TECHNICAL FIELD

The present invention relates to a cooling device and an image forming apparatus including the cooling device.

DESCRIPTION OF THE RELATED ART

Conventionally, an image forming apparatus that forms an image on paper has been known. In a conventional image forming apparatus, as a configuration equipped with a cooling system for blowing cooling air to a part to be cooled (for example, a toner transport path, etc.), there has been a disclosed configuration having a branched cooling duct and performing uniform cooling in a longitudinal direction of the cooling duct by exhausting sucked cooling air from two branch points (for example, see JP 2020-194064 A).

In addition, a configuration has been disclosed in which at least one of a fan for discharging air in an apparatus body to the outside of the apparatus body or a fan for introducing air outside the apparatus body into the apparatus body is provided, the cross-sectional area of a cooling duct is narrowed from an inlet toward the back side, and uniform cooling is performed in a longitudinal direction of the cooling duct by substantially uniformizing a wind speed of air blown out from a plurality of openings formed in the cooling duct along from the inlet to the back side (for example, see JP 2002-14597 A).

SUMMARY OF THE INVENTION

However, each of the configurations described in JP 2020-194064 A and JP 2002-14597 A is a configuration in which the part to be cooled is cooled at a uniform wind speed (air volume) without considering a flow of cooling air for the entire apparatus (overall cooling air). Therefore, cooling air (partial cooling air) that cools the part to be cooled flows from windward to leeward of the overall cooling air, so that the leeward side of the part to be cooled is more cooled, and instead, cooling of the windward side becomes insufficient. Thus, there is a problem in that cooling air (partial cooling air) cannot be effectively used.

An object of the invention is to provide a cooling device capable of uniformly cooling a part to be cooled while efficiently using the cooling air (partial cooling air), and an image forming apparatus including the cooling device.

To achieve at least one of the abovementioned objects, according to an aspect of the present invention, a cooling device reflecting one aspect of the present invention is a cooling device which cools an inside of an image forming apparatus that forms an image on paper, and the cooling device includes:

an overall cooler that cools an entire inside of the image forming apparatus using overall cooling air flowing inside the image forming apparatus; and a partial cooler that blows cooling air to a part to be cooled to cool the part to be cooled, wherein volume of the cooling air on a leeward side of the overall cooling air is smaller than volume of the cooling air on a windward side of the overall cooling air in the partial cooler.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION

Hereinafter, one or more embodiments of the present invention will be described with reference to the drawings. However, the scope of the invention is not limited to the disclosed embodiments.

Figure 1:
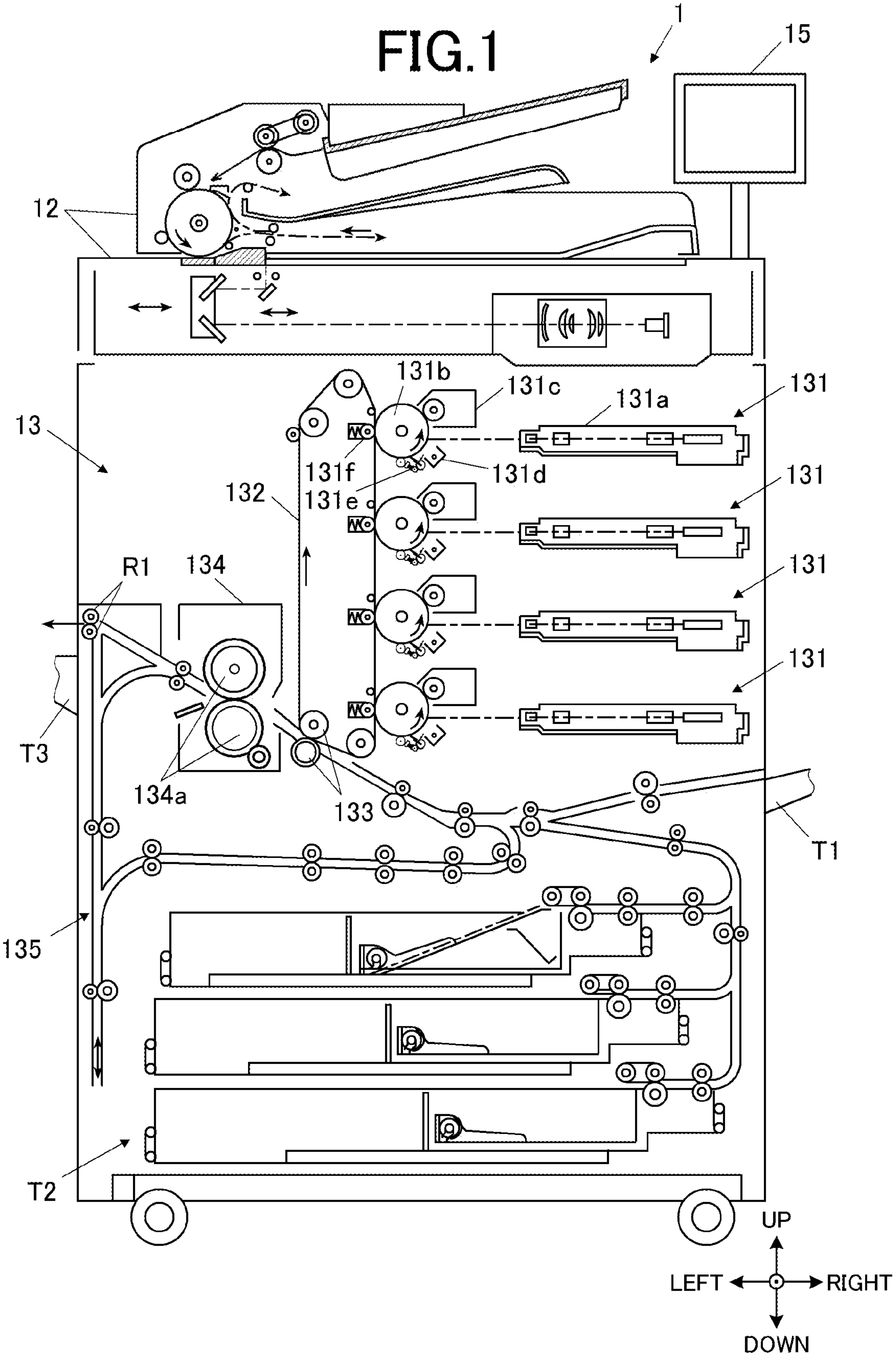
FIG. 1 is a front view showing a schematic configuration of an image forming apparatus according to this embodiment.
Figure 2:
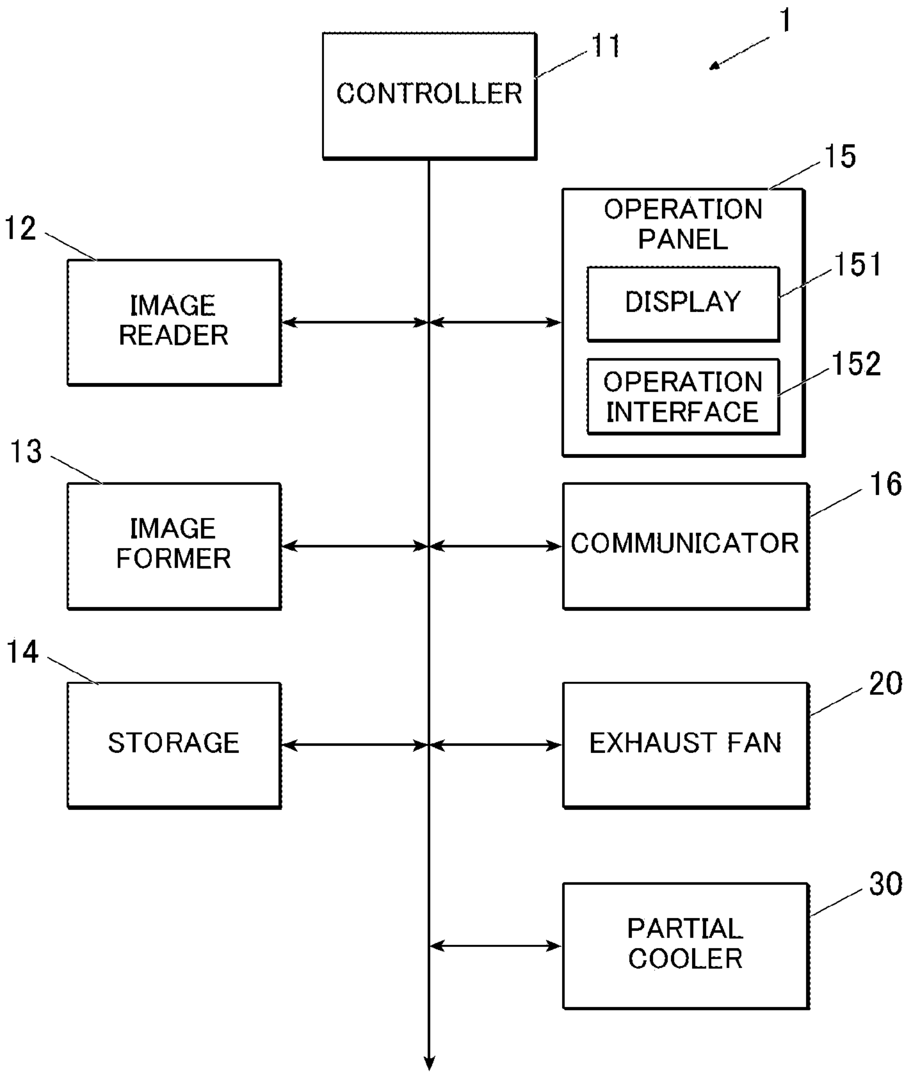
FIG. 2 is a functional block diagram showing a control structure of the image forming apparatus according to this embodiment.

As shown in FIG. 1 and FIG. 2, an image forming apparatus 1 according to this embodiment includes a controller 11 (hardware processor), an image reader 12, an image former 13, a storage 14, an operation panel 15 (a display 151 and an operation interface 152), a communicator 16, an exhaust fan 20 (overall cooler), and a partial cooler 30.

The controller 11 includes a CPU, a RAM, a ROM, etc. The CPU reads various processing programs stored in the ROM according to an operation signal input from the operation interface 152 or an instruction signal received by the communicator 16, loads the processing programs in the RAM, and comprehensively controls an operation of the image forming apparatus 1 in cooperation with the various programs loaded in the RAM.

The image reader 12 scans and exposes an image of a document placed on a document platen (not shown) or an auto document feeder (ADF) using an optical system of a scanning exposure device and reads reflected light thereof using a line image sensor, thereby obtaining an image signal. The image signal is subjected to processing such as A/D conversion, shading correction, compression, etc., and then input to the controller 11 as image data. The image data input to the controller 11 is not limited to data read by the image reader 12, and may be, for example, data received from an external device (not shown) via the communicator 16.

The image former 13 forms an image including four colors of C, M, Y, and K on paper according to pixel values of four colors of each pixel in an image-processed original image.

As shown in FIG. 1, the image former 13 includes four writers 131, an intermediate transfer belt 132, a secondary transfer roller 133, a fixing section 134, etc.

The four writers 131 are disposed in series (tandem) along a belt surface of the intermediate transfer belt 132 and each form an image of each color of C, M, Y, and K. The respective writers 131 have the same configuration except that colors of formed images are different from each other, and each includes an exposure section 131*a*, a photoreceptor 131*b*, a development section 131*c*, a charger 131*d*, a cleaner 131*e*, and a primary transfer roller 131*f*.

At the time of image formation, in each writer 131, after charging the photoreceptor 131*b* using the charger 131*d*, the photoreceptor 131*b* is scanned with light flux emitted by the exposure section 131*a* based on the original image, and an electrostatic latent image is formed on the photoreceptor 131*b*. When development is performed by supplying a coloring material such as toner to the electrostatic latent image formed on the photoreceptor 131*b* using the development section 131*c*, an image (toner image) is formed on the photoreceptor 131*b*.

The images formed on the photoreceptors 131*b* of the four writers 131, respectively, are sequentially and overlappingly transferred (primary transfer) onto the intermediate transfer belt 132 by the respective primary transfer rollers 131*f* In this way, an image of each color is formed on the intermediate transfer belt 132. The intermediate transfer belt 132 is an image carrier that is wound around a plurality of rollers and rotates. After the primary transfer, the cleaner 131*e* removes the coloring material remaining on the photoreceptor 131*b*.

In the image former 13, paper is fed from a manual feed tray T1 or a paper feed tray T2 in synchronization with the timing when the image on the rotating intermediate transfer belt 132 reaches a position of the secondary transfer roller 133. In the secondary transfer roller 133, one of a pair of rollers is in pressure contact with the intermediate transfer belt 132, and the other roller is configured as one of a plurality of rollers around which the intermediate transfer belt 132 is wound. When the image is transferred (secondary transfer) from the intermediate transfer belt 132 onto the paper by the pressure contact of the secondary transfer roller 133, the paper is transported to the fixing section 134 and subjected to a fixing process, and the paper is discharged to a paper discharge tray T3 by a paper discharge roller R1. The fixing process is a process of fixing an image on the paper by heating and pressing the paper using a fixing roller 134*a*. When images are formed on both sides of the paper, the paper is transported to a reversing path 135 to reverse surfaces of the paper, and then the paper is fed again to the position of the secondary transfer roller 133.

The storage 14 is a nonvolatile storage including an HDD (Hard Disk Drive), an SSD (solid state drive), etc., and stores various programs, various setting data, etc. in a readable and writable manner by the controller 11.

The operation panel 15 includes the display 151 that displays various information to a user, and the operation interface 152 that receives operation input by the user.

The display 151 includes a color liquid crystal display, etc., and displays an operation screen, etc. (various setting screens, various buttons, an operation status of each function, etc.) according to a display control signal input from the controller 11.

The operation interface 152 includes a touch panel provided on a screen of the display 151, and various hard keys disposed around the screen of the display 151. When a button displayed on the screen is pressed using a finger, a touch pen, etc., the operation interface 152 detects XY coordinates of a pressed power point as a voltage value, and outputs an operation signal associated with a detected position to the controller 11. Note that the touch panel is not limited to a pressure-sensitive type, and may be, for example, an electrostatic type or an optical type. In addition, when a hard key is pressed, the operation interface 152 outputs an operation signal associated with the pressed key to controller 11. By operating the operation interface 152, the user can perform settings related to image formation such as image quality settings, magnification settings, application settings, output settings, and paper settings, paper transport instructions, and apparatus stop operations.

The communicator 16 is an interface that connects the image forming apparatus 1 to a communication network. The communicator 16 has a communication IC, a communication connector, etc., and uses a predetermined communication protocol to transmit and receive various types of information to and from an external device connected to the communication network under the control of the controller 11. In addition, the communicator 16 can input and output various information via a USB.

Figure 3:
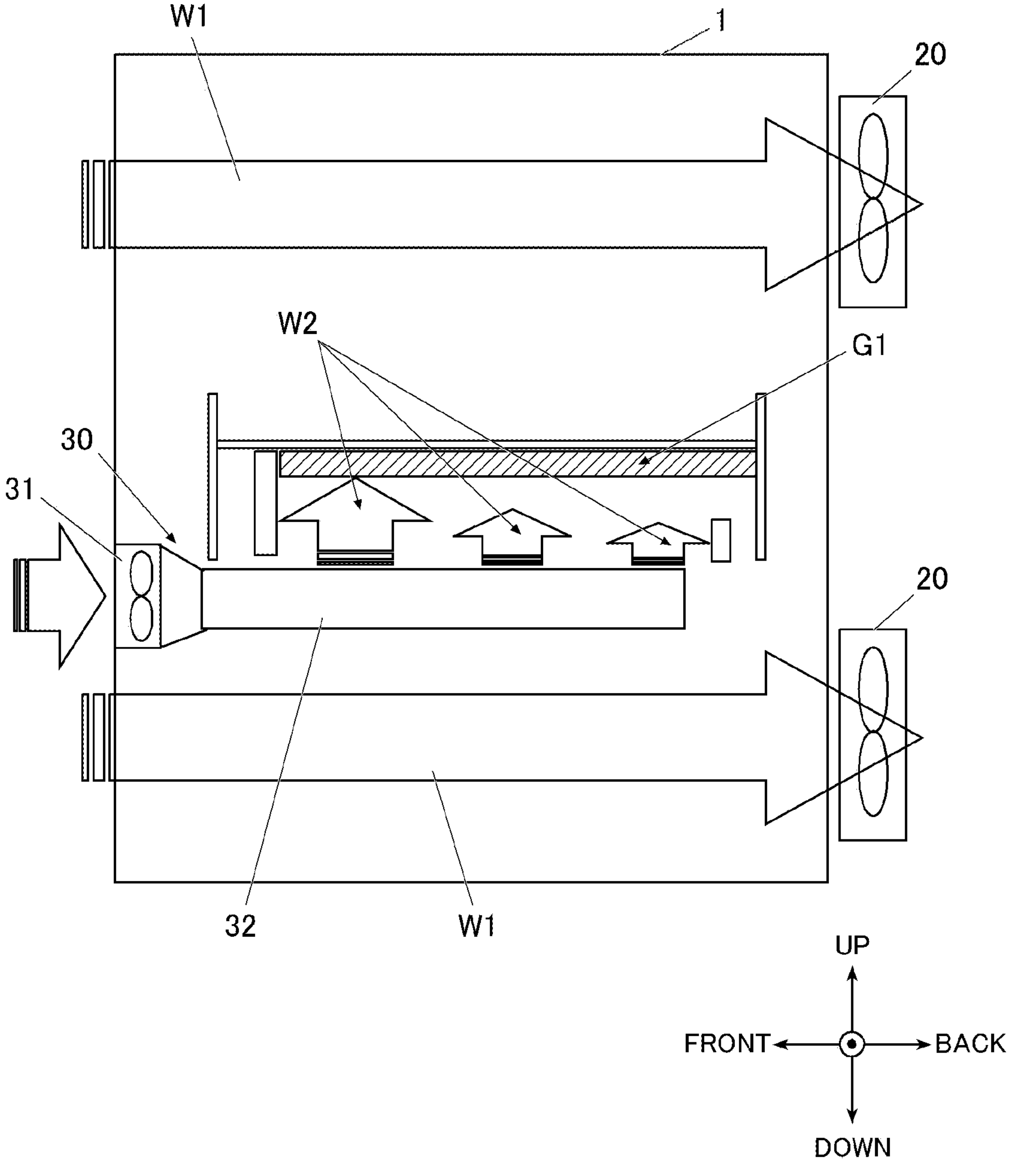
FIG. 3 is a side view showing a schematic configuration and arrangement of an overall cooler and a partial cooler.

As shown in FIG. 3, one exhaust fan (overall cooler) 20 is provided in each of an upper part and a lower part on a back surface side of the image forming apparatus 1, and air inside the image forming apparatus 1 is discharged to the outside to create a flow of air (overall cooling air W1) from a front surface side to the back surface side inside the image forming apparatus 1, thereby cooling the entire inside of the image forming apparatus 1.

Figure 4:
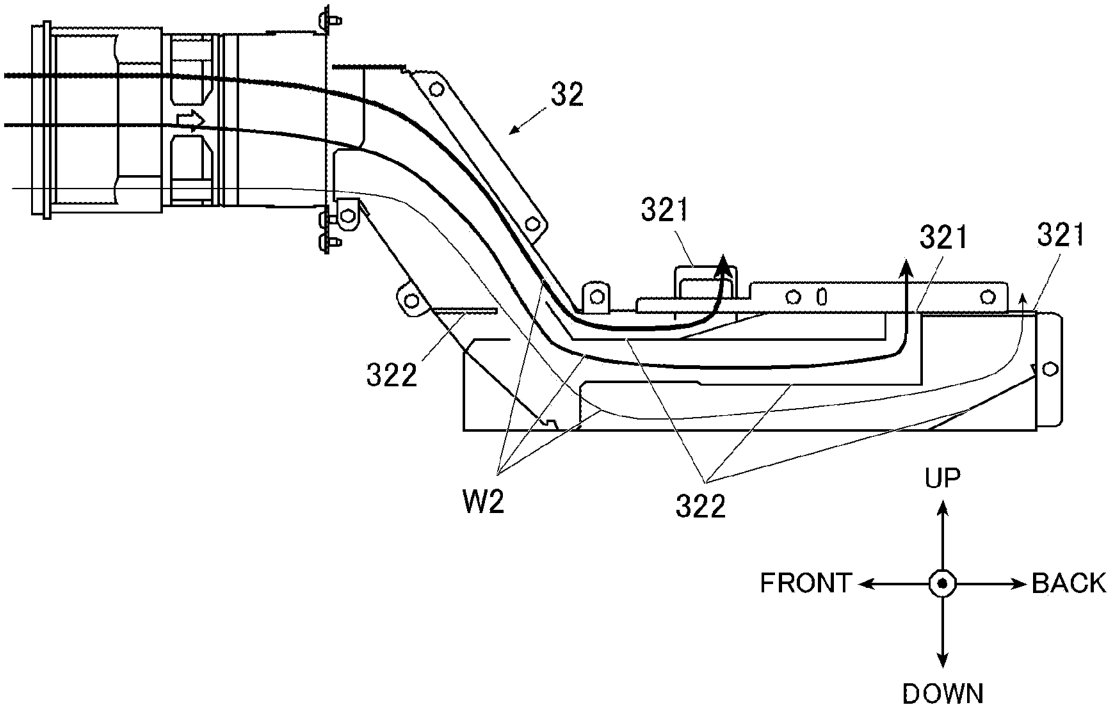
FIG. 4 is a side view showing a schematic configuration of a duct of the partial cooler.

As shown in FIG. 3 and FIG. 4, the partial cooler 30 includes an air intake fan 31 that draws air from outside the image forming apparatus 1 and generates cooling air (partial cooling air W2) to be blown to a part to be cooled G1, and a duct 32 that is connected to the air intake fan 31 and has a plurality of outlets 321 for blowing out the cooling air (partial cooling air W2) generated by the air intake fan 31 in a direction in which the overall cooling air W1 flows, and cools the part to be cooled G1 by blowing the cooling air (partial cooling air W2) blown out from the plurality of outlets 321 to the part to be cooled G1 (for example, a toner transport path, etc.) disposed at positions facing the plurality of outlets 321. When unevenness (another member) is present around the part to be cooled G1, it is difficult to cool a part hidden behind the unevenness using air (overall cooling air W1) by the exhaust fan 20, and thus the partial cooler 30 is provided to blow cooling air from a lower side of the part to be cooled G1.

In an example shown in FIG. 3, description of components other than the exhaust fan 20 and the partial cooler 30 is appropriately omitted for convenience of description.

The inside of the duct 32 is divided by air volume adjustment walls 322 to form a plurality of paths leading to the plurality of outlets 321, respectively. The duct 32 is added to the existing configuration and is configured to pass through gaps of internal components and thus forms a curved path. Further, the volume of cooling air generated from the air intake fan 31 is small. For this reason, in this embodiment, as shown in FIG. 4, the air volume adjustment walls 322 are disposed inside the duct 32 to adjust the volume of the cooling air flowing toward each outlet 321. Specifically, the air volume adjustment walls 322 are disposed so that the volume of the cooling air (partial cooling air W2) blown out from the outlets 321 decreases from a windward side (front surface side) toward a leeward side (back surface side) of the overall cooling air W1. That is, when the air volume adjustment walls 322 are disposed so that the volume of cooling air blown out from the outlets 321 on the leeward side of the overall cooling air W1 becomes smaller than the volume of cooling air blown out from the outlets 321 on the windward side of the overall cooling air W1, the volume of cooling air on the leeward side of the overall cooling air W1 is smaller than the volume of cooling air on the windward side of the overall cooling air W1 in the partial cooler 30.

As described above, the air volume adjustment walls 322 function as an adjuster of the invention that adjusts the volume of the cooling air (partial cooling air W2) blown out from the outlets 321 in the direction in which the overall cooling air W1 flows.

The cooling device of the invention includes at least the exhaust fan (overall cooler) 20 and the partial cooler 30.

As described above, the cooling device according to the present embodiment includes the overall cooler (exhaust fan 20) that cools the entire inside of the image forming apparatus 1 with the overall cooling air W1 flowing inside the image forming apparatus 1, and the partial cooler 30 that cools the part to be cooled G1 by blowing cooling air to the part to be cooled G1. Further, in the partial cooler 30, the volume of the cooling air on the leeward side of the overall cooling air W1 is smaller than the volume of the cooling air on the windward side of the overall cooling air W1.

Therefore, according to the cooling device according to this embodiment, even when using the partial cooler 30 (air intake fan 31) having the small air volume due to power source capacity, arrangement space, cost, etc., since the volume of the cooling air (partial cooling air W2) can be efficiently used, the part to be cooled G1 can be uniformly cooled.

Further, according to the cooling device according to this embodiment, the partial cooler 30 includes the adjuster (air volume adjustment walls 322) that adjusts the volume of the cooling air in the direction in which the overall cooling air W1 flows.

Therefore, according to the cooling device according to this embodiment, since the volume of the cooling air (partial cooling air W2) can be efficiently used with a simple configuration, the part to be cooled G1 can be uniformly cooled easily.

Further, according to the cooling device according to this embodiment, the partial cooler 30 includes the duct 32 having the plurality of outlets 321 for blowing out the cooling air in the direction in which the overall cooling air W1 flows. Further, the inside of the duct 32 is divided by the air volume adjustment walls 322 to form a plurality of paths leading to the plurality of outlets 321, respectively, and the air volume adjustment walls 322 are disposed so that the volume of the cooling air blown out from the outlets 321 on the leeward side of the overall cooling air W1 is smaller than the volume of the cooling air blown out from the outlets 321 on the windward side of the overall cooling air W1.

Therefore, according to the cooling device according to this embodiment, since the volume of the cooling air (partial cooling air W2) can be efficiently used with a simple configuration, the part to be cooled G1 can be uniformly cooled easily.

As described above, even though the invention has been specifically described based on the embodiment, the invention is not limited to the above embodiment, and may be modified without departing from the scope of the invention.

First Modified Example

For example, in the above-described embodiment, the air volume adjustment walls 322 are disposed inside the duct 32 to adjust the volume of the cooling air directed to each outlet 321. However, the invention is not limited thereto.

Figure 5A:
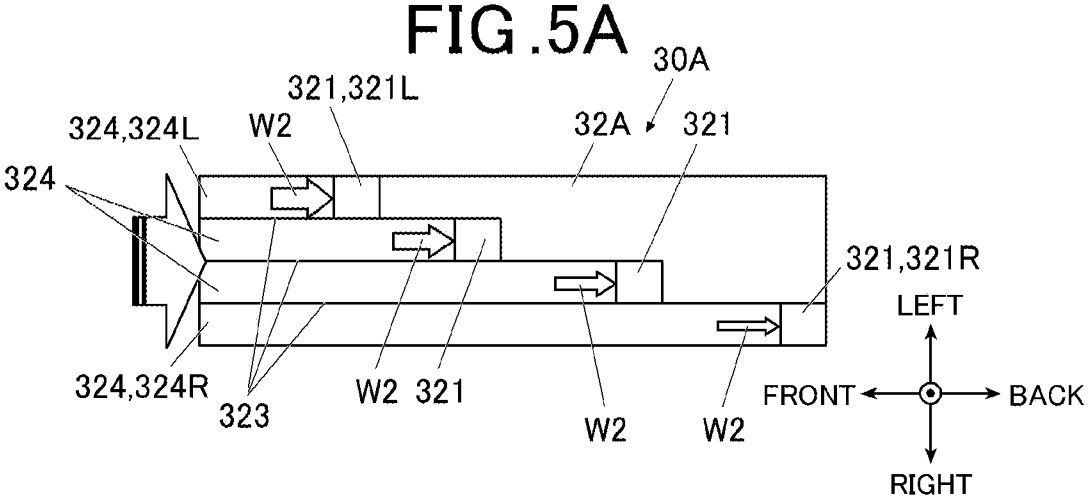
FIG. 5A is a diagram showing a schematic configuration of a duct of the partial cooler according to a first modified example.
Figure 5B:
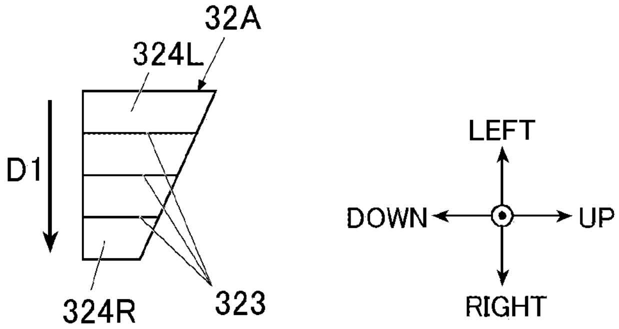
FIG. 5B is another diagram showing a schematic configuration of the duct of the partial cooler according to the first modified example.
Figure 5C:
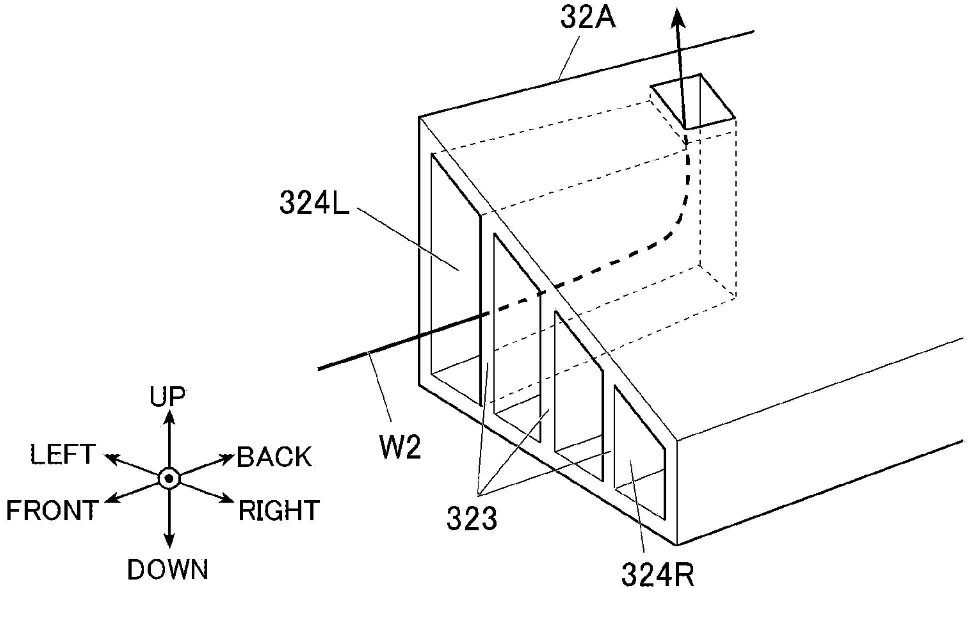
FIG. 5C is still another diagram showing a schematic configuration of the duct of the partial cooler according to the first modified example.

For example, as shown in FIGS. 5A, FIG. 5B, and FIG. 5C, the inside of a duct 32A may be divided by division walls 323 to form a plurality of paths 324 connected to each of a plurality of outlets 321, and volume of cooling air directed to each outlet 321 may be adjusted by decreasing a cross-sectional area of each path 324 leading to each outlet 321 in a direction from the outlets 321 on the windward side of the overall cooling air W1 toward the outlets 321 on the leeward side of the overall cooling air W1. FIG. 5A is a plan view of the duct 32A, FIG. 5B is a side sectional view of the duct 32A viewed from a front surface side of the duct 32A, and FIG. 5C is an external perspective view of the duct 32A.

Specifically, in the partial cooler 30A according to the first modified example, the inside of the duct 32A is uniformly divided in a width direction (left-right direction) by the division walls 323, and a height of the duct 32A is different in the width direction. Further, the height of the duct 32A decreases (the cross-sectional area of the paths 324 decreases) in a direction from an outlet 321L side (left side) on the windward side of the overall cooling air W1 toward an outlet 321R side (right side) on the leeward side of the overall cooling air W1 (see an arrow D1 of FIG. 5B) in the width direction so that a cross-sectional area of a path 324L leading to the outlet 321L on the windward side (front surface side) of the overall cooling air W1 increases, and a cross-sectional area of a path 324R leading to the outlet 321R on the leeward side (back surface side) of the overall cooling air W1 decreases.

That is, in the plurality of paths 324, when the cross-sectional area of the path 324R leading to the outlet 321R on the leeward side of the overall cooling air W1 is smaller than the cross-sectional area of the path 324L leading to the outlet 321L on the windward side of the overall cooling air W1, the volume of the cooling air (partial cooling air W2) blown out from each outlet 321 decreases in a direction from the windward side toward the leeward side of the overall cooling air W. Thus, in the partial cooler 30A, the volume of the cooling air on the leeward side of the overall cooling air W1 is smaller than the volume of the cooling air on the windward side of the overall cooling air W1.

As described above, the plurality of paths 324 divided by the division walls 323 functions as the adjuster of the invention that adjusts the volume of the cooling air (partial cooling air W2) blown out from the outlets 321 in the direction in which the overall cooling air W1 flows.

As described above, the partial cooler 30A includes the duct 32A having the plurality of outlets 321 for blowing out the cooling air in the direction in which the overall cooling air W1 flows, and the inside of the duct 32A is divided by the division walls 323 to form the plurality of paths 324 leading to the plurality of outlets 321, respectively. Further, in the plurality of paths 324, the cross-sectional area of the path 324R leading to the outlet 321R on the leeward side of the overall cooling air W1 is smaller than the cross-sectional area of the path 324L leading to the outlet 321L on the windward side of the overall cooling air W1, so that the volume of the cooling air on the leeward side of the overall cooling air W1 is smaller than the volume of the cooling air on the windward side of the overall cooling air W1. Therefore, it becomes possible to efficiently use the volume of the cooling air (partial cooling air W2), and it is possible to uniformly cool the part to be cooled G1.

Second Modified Example

In addition, in the first modified example above described, the volume of the cooling air (partial cooling air W2) blown out from each outlet 321 is adjusted by decreasing the cross-sectional area of each path 324 leading to each outlet 321 in a direction from the outlet 321L on the windward side of the overall cooling air W1 toward the outlet 321R on the leeward side of the overall cooling air W1. However, the invention is not limited thereto.

Figure 6A:
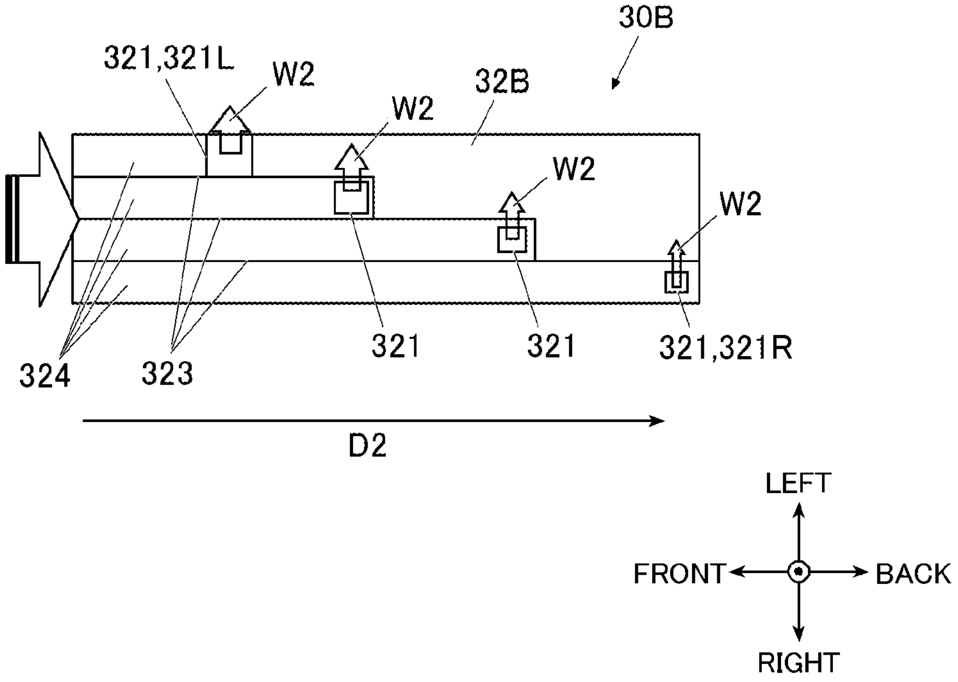
FIG. 6A is a diagram showing a schematic configuration of a duct of the partial cooler according to a second modified example.
Figure 6B:
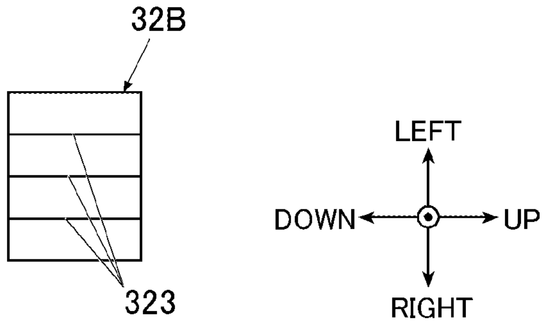
FIG. 6B is another diagram showing a schematic configuration of the duct of the partial cooler according to the second modified example.
Figure 7:
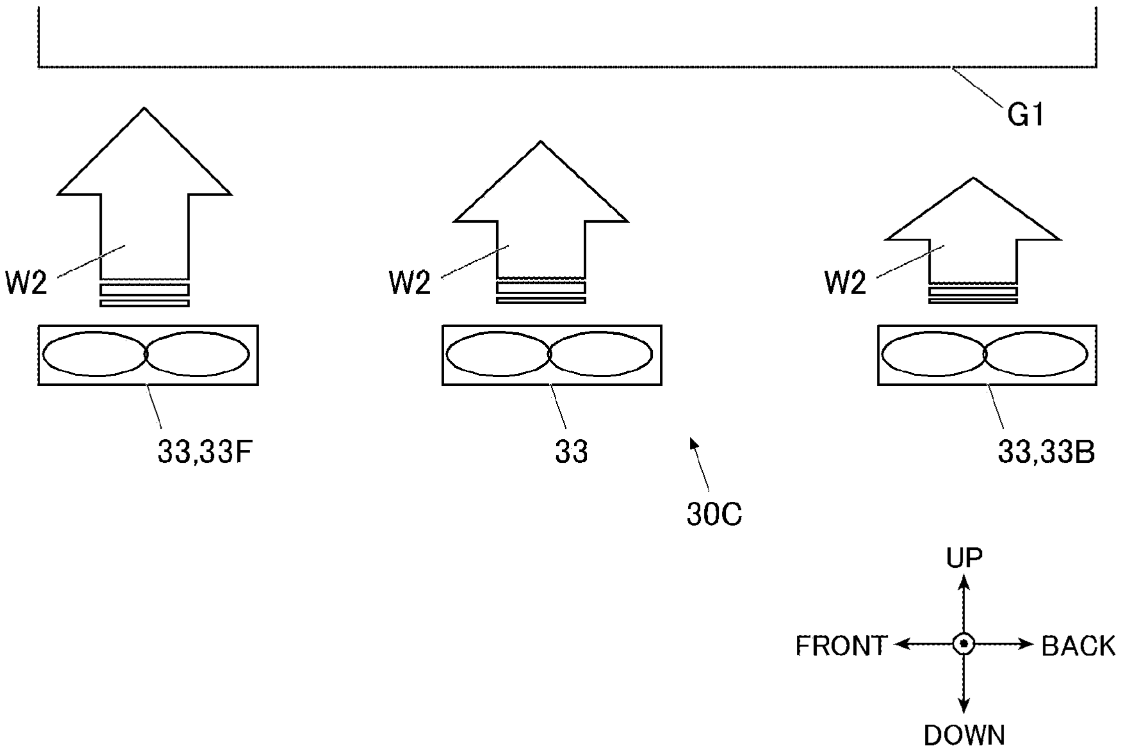
FIG. 7 is a side view showing a schematic configuration of a partial cooler according to a third modified example.

For example, as shown in FIG. 6A and FIG. 6B, an inside of a duct 32B may be divided by division walls 323 to form a plurality of paths 324 leading to a plurality of outlets 321, respectively, and an opening area of each outlet 321 may be varied instead of varying the cross-sectional area of each path 324 leading to each outlet 321 (varying the height of the duct 32A in the width direction). Note that FIG. 6A is a plan view of the duct 32B, and FIG. 6B is a side cross-sectional view seen from a front surface side of the duct 32B.

Specifically, in a partial cooler 30B according to a second modified example, the opening area of the outlet 321 is decreased in a direction from the outlet 321L side on the windward side of the overall cooling air W1 toward the outlet 321R side on the leeward side of the overall cooling air W1 in the width direction (left-right direction) (see arrow D2 of FIG. 6A) so that the opening area of the outlet 321L on the windward side of the overall cooling air W1 becomes large, and the opening area of the outlet 321R on the leeward side of the overall cooling air W1 becomes small.

That is, in the plurality of outlets 321, when the opening area of the outlet 321R on the leeward side of the overall cooling air W1 is smaller than the opening area of the outlet 321L on the windward side of the overall cooling air W1, the volume of the cooling air (partial cooling air W2) blown out from each outlet 321 decreases in a direction from the windward side toward the leeward side of the overall cooling air W1. Thus, in the partial cooler 30B, the volume of the cooling air on the leeward side of the overall cooling air W1 is smaller than the volume of the cooling air on the windward side of the overall cooling air W1.

As described above, the plurality of outlets 321 functions as the adjuster of the invention that adjusts the volume of the cooling air (partial cooling air W2) blown out from the outlets 321 in the direction in which the overall cooling air W1 flows.

As described above, when the partial cooler 30B includes the duct 32B having the plurality of outlets 321 that blows out the cooling air in the direction in which the overall cooling air W1 flows, the inside of the duct 32B is divided by the division walls 323 to form the plurality of paths 324 leading to the plurality of outlets 321, respectively, and the opening area of the outlet 321R on the leeward side of the overall cooling air W1 is smaller than the opening area of the outlet 321L on the windward side of the overall cooling air W1 in the plurality of outlets 321, the volume of the cooling air on the leeward side of the overall cooling air W1 becomes smaller than the volume of the cooling air on the windward side of the overall cooling air W1. Thus, it becomes possible to efficiently use the volume of the cooling air (partial cooling air W2), and it is possible to uniformly cool the part to be cooled G1.

Third Modified Example

In addition, instead of the first modified example or the second modified example, described above, a plurality of cooling fans 33 for blowing out the cooling air (partial cooling air W2) may be arranged side by side in the direction in which the overall cooling air W1 flows. That is, a partial cooler 30C according to a third modified example includes at least the plurality of cooling fans 33. In this case, the controller (adjuster) 11 controls rotational speeds of the plurality of cooling fans 33 so that a rotational speed of a cooling fan 33B on the leeward side (back surface side) of the overall cooling air W1 is lower than that of a cooling fan 33F on the windward side (front surface side) of the overall cooling air W1. That is, in the plurality of cooling fans 33, the rotational speed of the cooling fan 33F on the windward side of the overall cooling air W1 is high, and the rotational speed of the cooling fan 33B on the leeward side of the overall cooling air W1 is low. In this way, the rotational speeds of the cooling fans 33 become lower in a direction from the windward side toward the leeward side of the overall cooling air W1. Therefore, it is possible to reduce the volume of the cooling air (partial cooling air W2) in the direction from the windward side toward the leeward side of the overall cooling air W1, and to uniformly cool the part to be cooled G1 while minimizing driving power of the cooling fans 33.

In the third modified example, a configuration in which the duct 32 is not provided has been described as an example. However, it is possible to adopt a configuration in which the duct 32 is provided, and the plurality of cooling fans 33 is provided inside the duct 32.

As described above, when the partial cooler 30C includes the plurality of cooling fans 33 that blows out the cooling air in the direction in which the overall cooling air W1 flows, and the adjuster (controller 11) controls the rotational speeds of the plurality of cooling fans 33 so that the rotational speed of the cooling fan 33B on the leeward side of the overall cooling air W1 is lower than that of the cooling fan 33F on the windward side of the overall cooling air W1, it is possible to reduce the volume of the cooling air (partial cooling air W2) in the direction from the windward side toward the leeward side of the overall cooling air W1, and to uniformly cool the part to be cooled G1 while minimizing driving power of the cooling fans 33.

In addition, a detailed configuration and a detailed operation of each device included in the image forming apparatus may be changed as appropriate without departing from the scope of the invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A cooling device which cools an inside of an image forming apparatus that forms an image on paper, the cooling device comprising:

an overall cooler that cools an entire inside of the image forming apparatus using overall cooling air flowing inside the image forming apparatus; and a partial cooler that blows cooling air to a part to be cooled to cool the part to be cooled, wherein volume of the cooling air on a leeward side of the overall cooling air is smaller than volume of the cooling air on a windward side of the overall cooling air in the partial cooler, wherein:

the partial cooler includes a duct having a plurality of outlets for blowing out the cooling air in the direction in which the overall cooling air flows;

an inside of the duct is divided by division walls to form a plurality of paths leading to the plurality of outlets, respectively;

a cross-sectional area of a path leading to each of the outlets on the leeward side of the overall cooling air is smaller than a cross-sectional area of a path leading to each of the outlets on the windward side of the overall cooling air in the plurality of paths; and a first outlet of the plurality of outlets has a first cross-sectional area greater than a second cross-sectional area of a second outlet of the plurality of outlets.

2. The cooling device according to claim 1, wherein the partial cooler includes a hardware processor that adjusts the volume of the cooling air in a direction in which the overall cooling air flows.

3. The cooling device according to claim 2, wherein:

the partial cooler includes a duct having a plurality of outlets for blowing out the cooling air in the direction in which the overall cooling air flows;

an inside of the duct is divided by air volume adjustment walls to form a plurality of paths leading to the plurality of outlets, respectively; and the air volume adjustment walls are disposed so that volume of the cooling air blown out from the outlets on the leeward side of the overall cooling air is smaller than volume of the cooling air blown out from the outlets on the windward side of the overall cooling air.

4. The cooling device according to claim 2, wherein:

the partial cooler includes a duct having a plurality of outlets for blowing out the cooling air in the direction in which the overall cooling air flows;

an inside of the duct is divided by division walls to form a plurality of paths leading to the plurality of outlets, respectively; and an opening area of each of the outlets on the leeward side of the overall cooling air is smaller than an opening area of each of the outlets on the windward side of the overall cooling air in the plurality of outlets.

5. The cooling device according to claim 2, wherein:

the partial cooler includes a plurality of cooling fans for blowing out the cooling air in the direction in which the overall cooling air flows; and the hardware processor controls rotational speeds of the plurality of cooling fans so that a rotational speed of each of the cooling fans on the leeward side of the overall cooling air is lower than a rotational speed of each of the cooling fans on the windward side of the overall cooling air.

6. An image forming apparatus comprising:

an image former that forms an image on paper; and the cooling device according to claim 1 which cools an inside of the apparatus.

* * * * *